(12) United States Patent
Aliakseyeu

(10) Patent No.: US 9,261,967 B2
(45) Date of Patent: Feb. 16, 2016

(54) GESTURE RECOGNITION SYSTEM

(75) Inventor: Dzmitry Viktorovich Aliakseyeu, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 127 days.

(21) Appl. No.: 13/983,783

(22) PCT Filed: Feb. 6, 2012

(86) PCT No.: PCT/IB2012/050523
§ 371 (c)(1),
(2), (4) Date: Aug. 6, 2013

(87) PCT Pub. No.: WO2012/114216
PCT Pub. Date: Aug. 30, 2012

(65) Prior Publication Data
US 2013/0321009 A1      Dec. 5, 2013

(30) Foreign Application Priority Data

Feb. 21, 2011 (EP) .................................. 11155199

(51) Int. Cl.
*G01R 27/26* (2006.01)
*G06F 3/01* (2006.01)

(52) U.S. Cl.
CPC ............... *G06F 3/017* (2013.01); *G06F 3/015* (2013.01)

(58) Field of Classification Search
CPC ......... G06F 3/015; G06F 3/017; G06F 3/044; G06F 2203/04106; G06F 2203/04108
USPC ............................................... 324/693, 699
See application file for complete search history.

(56) References Cited

U.S. PATENT DOCUMENTS

| 2002/0075232 | A1  | 6/2002  | Daum et al. |
| 2004/0243342 | A1* | 12/2004 | Rekimoto ..................... 702/150 |
| 2007/0149282 | A1  | 6/2007  | Lu et al. |
| 2009/0326406 | A1* | 12/2009 | Tan et al. ..................... 600/546 |
| 2010/0066664 | A1  | 3/2010  | Son et al. |

FOREIGN PATENT DOCUMENTS

| GB | 2310377 A    | 6/1997  |
| WO | 2005121939 A2 | 12/2005 |

OTHER PUBLICATIONS

Cortes et al, "Support-Vector Networks", Machine Learning, 20, 1995, pp. 1-31.
Li, "Integrating User Affective State Assessment in Enhancing HCI: Review and Proposition", The Ope Cybernetics and Systemics Journal, vol. 2, Pages, 2008, pp. 192-205.
Laufer et al, "Predicting User Action From Skin Conductance", Budapest University of Technology and Economics, 2008, pp. 357-360.
Wilson, "Robust Computer Vision-Based Detection of Pinching for One and Two-Handed Gesture Input", Proceedings of UIST, 2006, pp. 1-4.
Hardesty, "Gesture-Based Computing on the Cheap", MIT News, Downloaded From Http:// News.Mit.Edu/2010/Gesture-Computing-0520, Sep. 17, 2015.
Harrison et al, "Skinput: Appropriating the Body As an Input Surface", Proceedings of Chi, 2010, pp. 453-462.
Saponas et al, "Enabling Always-Available Input With Musscle-Computer Interfaces", Proceedings of UIST, 2009, pp. 167-176.

* cited by examiner

*Primary Examiner* — Vincent Q Nguyen

(57) ABSTRACT

A device, a method and a system for detecting and recognizing gestures, such as different hand gestures, includes at least one electrode for measuring an electrical property of a skin of a user, for example the electrical conductance of the skin and/or its change. From these measurement data, different gestures assumed by the body can be recognized.

18 Claims, 2 Drawing Sheets

GESTURE RECOGNITION SYSTEM

CROSS-REFERENCE TO PRIOR APPLICATIONS

This application is the U.S. National Phase application under U.S.C. §371 of International Application No. PCT/2012/050523, filed on Feb. 6, 2012, which claims the benefit of European Patent Application No. 11155199.9, filed Feb. 21, 2011. These applications are hereby incorporated by reference herein.

FIELD OF THE INVENTION

The invention relates to a gesture detection device and a method for detecting gestures of a user, i.e. to means for collecting data from which a gesture can be inferred. Moreover, it relates to a gesture recognition system and a method for recognizing gestures of a user, i.e. to means for collecting and evaluating data with respect to gestures.

BACKGROUND OF THE INVENTION

In the US 2002/0075232 A1, a system for the recognition of gestures made by a user is described that comprises a glove in which the electrical resistance of a conducting rubber layer is measured. Stretching or compressing of the glove can thus be detected and evaluated with respect to hand gestures made by the user.

SUMMARY OF THE INVENTION

In view of this background, it was an object of the present invention to provide means for reliably detecting and recognizing gestures with little effort of hardware to be worn by the user.

According to its first aspect, the invention relates to a gesture detection device for detecting gestures of a user. In the context of the present invention, the term "gesture" shall be understood in a broad sense, comprising any configuration or posture a living body can assume. In particular, gestures shall comprise the postures a human body can voluntarily assume and that represent a symbol for some piece of information, e.g. for a command. The gesture detection device according to the present invention comprises at least one electrode for measuring an electrical property of the skin of the user of the device. In practice, two or more electrodes will typically be used to measure the desired electrical property of the skin.

According to its second aspect, the invention relates to a method for detecting gestures of a user, said method comprising the measurement of an electrical property of the skin of the user. The method comprises in general form the procedures that can be executed by the aforementioned gesture detection device. Remarks, explanations, and definitions made for the gesture detection device will therefore analogously apply for the method, too, and vice versa.

The gesture detection device and the method exploit the measurement of an electrical property of the skin for detecting gestures made by a user, i.e. for providing data from which gestures can be inferred. This approach has the advantage that it requires little hardware effort for data collection. All that is needed is one (or more) electrode(s) in contact to the skin of the user. Moreover, the approach is quite sensitive and reliable, because different gestures will always have some effect on the skin that covers the body parts making said gestures, wherein these effects usually comprise changes in electrical properties of the skin. As said changes are typically local, the electrode(s) is/are favorably attached to regions of the skin that are most affected by the gestures of interest (e.g. regions that are maximally stretched or compressed).

In the following, various embodiments of the invention will be described that relate both to the gesture detection device and the method defined above.

The electrical property of the skin that is measured may in general be any property or value which is affected by different gestures. Preferably, it is a passive electrical property, i.e. a property comprising no active generation of electrical voltages by or in the body of the user. Passive electrical properties comprise for example the capacitance of the skin and, which is a most preferred option, the electrical conductance of the skin. Electrical conductance (or, equivalently, electrical impedance) is a property that can readily be measured and that is at the same time quite sensitive to different gestures because gestures are usually accompanied by the stretching or compressing of different regions of the skin, which in turn affects the local conductance of the skin.

The measured electrical property of the skin may furthermore comprise the CHANGE of one of the aforementioned electrical properties, particularly the change of the electrical conductance of the skin. As an electrical property of the skin usually depends on a variety of influences besides gesture, a particular value of such a property will often not allow to unambiguously determine the corresponding gesture. For example, it is well known that electrical conductance of the skin is influenced by the emotional state of a person. For this reason, the change of an electrical property will often provide a more reliable indicator of gestures. Changes in electrical properties may particularly occur when a gesture is assumed or stopped, i.e. during the transition from one gesture to another. During such a transition between gestures, other influences on the electrical properties of the skin (e.g. emotional state) usually remain constant. The change of the electrical property can therefore with high reliability be attributed to the change of gestures. It should be noted that the "change" of an electrical property may comprise single values representing a rate of change (i.e. a velocity) as well as a plurality of values representing a "trajectory" of the property.

It was already mentioned that gestures may comprise any configurations or postures the (human or animal) body can assume. In many practically important cases, gestures will comprise postures of the hand because hands are the most natural and versatile "instrument" of humans (after speech) for communicating information.

The at least one electrode that measures an electrical skin property is preferably attached to a hand or a wrist of a user. This allows for the aforementioned preferred detection of hand postures.

In another preferred embodiment of the invention, one or more electrodes are arranged on a flexible carrier, for example a textile mat, that can be attached to the skin and/or wrapped around a part of the body (e.g. the wrist). In this way the application of the usually small electrode(s) can be made more comfortable. Moreover, the carrier helps to guarantee a proper positioning of electrodes, particularly with respect to mutual distances between several electrodes.

The gesture detection device will typically comprise further assistant components that will not all be mentioned in detail, for example a communication device for transmitting (measurement-) data to another device, or a power supply (battery).

According to a third aspect, the invention relates to a gesture recognition system comprising the following two main components:

A gesture detection device of the kind described above, i.e. a device with at least one electrode for measuring an electrical property of the skin of a user.

A data processing device for recognizing gestures from the measurement data provided by the aforementioned gesture detection device. The data processing device may for example comprise a microprocessor or an FPGA.

According to a fourth aspect, the invention relates to a method for recognizing gestures of a user, said method comprising the recognition of gestures from measurement data of an electrical property of the skin of the user.

The gesture recognition system and the method according to the third and fourth aspect of the invention are related to the RECOGNITION of gestures, i.e. to the evaluation or interpretation of measurement data with the aim to assign a gesture from a set of possible gestures to these data. With the data processing device, the gesture recognition system comprises a component that allows to do such an evaluation automatically. The result of this automatic recognition procedure can then be further used by other components, for example to control CE devices like a VCR, a CD/DVD player or the like.

As far as the gesture recognition system and the method according to the third and fourth aspect of the invention make use of the measurement of an electrical property of the skin, the remarks, explanations and definitions made above for a gesture detection device and the associated method apply, too. Moreover, the system and the method can be realized with the particular embodiment described in the following.

According to one particular embodiment, a plurality of temporally consecutive measurement data is evaluated to recognize a gesture. The measurement data may belong to one gesture or several consecutive gestures. This approach provides a way to deal with a high variability of measurement data that is characteristic for electrical skin properties (as for biological parameters in general). The approach takes into account that a single measurement value often does not allow a reliable association to some gesture. For this reason, a plurality of measurement data belonging to an (initially unknown) gesture is collected, wherein these data are typically spread according to the variability of the electrical property. The whole set of data will however typically be distributed over a characteristic range or interval, which is more reliably associated to a certain gesture. Thus the measurement of electrical properties for some period, for example for several seconds, can in general help to increase the accuracy of gesture recognition.

According to a related embodiment, gestures are recognized from measurement data obtained during a transition between gestures. As was already explained above, measuring a change of electrical properties can often be used to more reliably infer the associated gesture. This is particularly true if the changes are due to a transition between gestures.

In a particular embodiment of the gesture recognition system, the gesture detection device and the data processing device are physically separate components that are (functionally) coupled via a wireless communication link. The gesture detection device, which has to be carried by a user, can thus be made as light as possible, while the necessary computing power for gesture recognition and data evaluation can be accommodated in the (stationary) data processing device.

According to another embodiment of the gesture recognition system, the gesture detection device and the data processing device constitute an integrated apparatus. An advantage of this approach is that only a minimal amount of data, namely the recognized gesture, has to be communicated to the outside.

The recognition method according to the fourth aspect of the invention will typically be realized with the help of a computing device, e.g. with the data processing device of the gesture detection device. Accordingly, the present invention further includes a computer program product which provides the functionality of any of the methods according to the present invention when executed on a computing device.

Further, the present invention includes a data carrier, for example a floppy disk, a hard disk, an EPROM, or a compact disc (CD-ROM), which stores the computer product in a machine readable form and which executes at least one of the methods of the invention when the program stored on the data carrier is executed on a computing device. The data carrier may particularly be suited for storing the program of the computing device mentioned in the previous paragraph.

Nowadays, such software is often offered on the Internet or a company Intranet for download, hence the present invention also includes transmitting the computer product according to the present invention over a local or wide area network.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers in the Figures refer to identical or similar components.

DESCRIPTION OF PREFERRED EMBODIMENTS

Gesture based interaction between a user and a controlled device is seen as a promising new interface design that may replace the use of classical buttons or a mouse. However, there are presently only few commercial applications of this approach (except touch screen "2D" gestures). This is due to the fact that a robust and simple recognition of gestures is challenging.

Many approaches to gesture recognition have significant disadvantages, for example the necessity to wear a particular (expensive and inconvenient) suit or glove. Video based gesture recognition usually does not require a user to wear or hold any additional devices, but it has a number of other disadvantages. For example, the hand of the user needs to be visible to the camera at all times, making this approach completely unusable in certain contexts (e.g. riding a bike, walking outside, etc.). Moreover, robustness depends very much on the illumination and contrast, which can change drastically depending on the environment or time of the day.

In view of this, a new approach for gesture detection and recognition is proposed here. An essential feature of this approach is the use of the skin and body conductance and/or its change in time to recognize postures or gestures.

Figure 1:
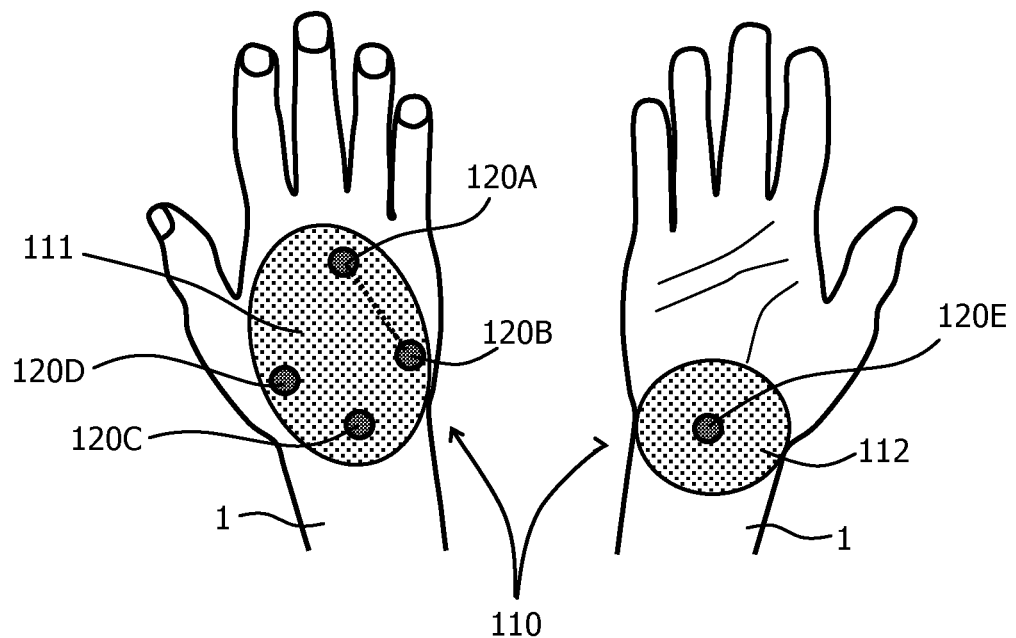
FIG. 1 illustrates a top view (left) and a bottom view (right) of a gesture detection device attached to the hand of a user.

FIG. 1 schematically illustrates a gesture detection device 110 for detecting different hand gestures according to the aforementioned general principle. The gesture detection device 110 comprises a first flexible carrier or patch 111 in which four electrodes 120A, 120B, 120C, and 120D are integrated at fixed locations. The first flexible patch 111 is attached to the upper side of the hand 1 of a user as shown in the left part of FIG. 1.

Additionally, the gesture detection device 110 comprises a second flexible patch 112 with a single electrode 120E, said patch 112 being attached to the palm/wrist as shown in the right part of FIG. 1 (it should be noted that FIG. 1 shows a top and a bottom view of the same hand 1).

Figure 2:
FIG. 2 illustrates different gestures of the hand that can be recognized.

The basic principle of the proposed method is the measurement of conductance (or resistance) between two points (connectors) located on the skin of a user. With the gesture detection device 110, for example the conductance between any two electrodes can be measured (e.g. the conductance $S_{AB}$ between electrodes 120A and 120B). As the user changes the hand posture, the conductance is also changed, for example because of the skin stretching between two points. Different gestures—some examples are illustrated in FIG. 2—will thus have different effects on the conductance.

Figure 3:
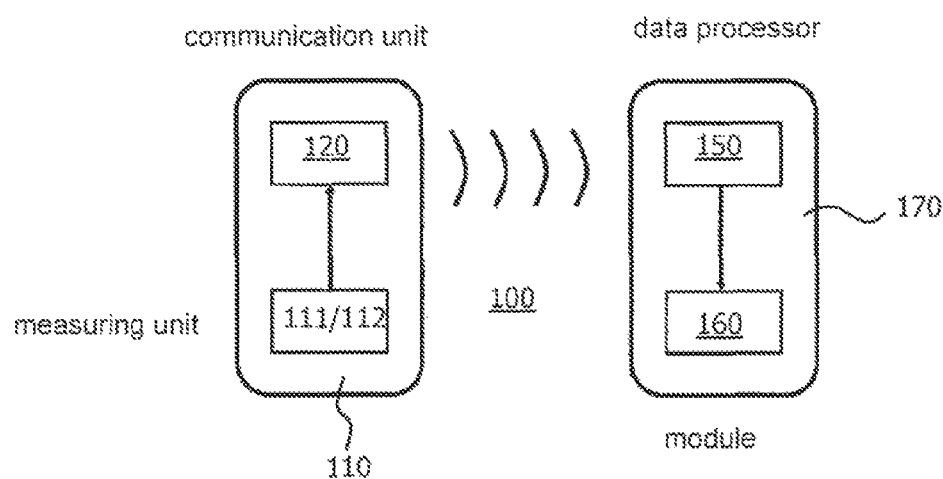
FIG. 3 schematically shows components of a gesture recognition system realized by two distinct devices.

FIG. 3 schematically shows a gesture recognition system 100 according to the present invention. The gesture recognition system 100 comprises two main components:

1. A gesture detection device 110 which provides the raw data needed for gesture recognition. The gesture detection device 110 comprises a conduction measuring unit, for example realized by the elastic patches 111 and 112 with electrodes 120A-120E of FIG. 1. Moreover, it comprises a wireless communication unit 120 (not shown in FIG. 1) for communicating measurement data provided by the conduction measuring unit to a data processing device 150. Furthermore, a battery is required for providing power for the communication unit and for measuring conductivity.

2. The aforementioned data processing device 150 (or "recognition engine"), which is programmed to evaluate the measurement data provided by the gesture detection device 110. Based on the result of the data processing device 150, various components and/or processes may be controlled in further modules 160. These modules 160 and the data processing device 150 may for example belong to a media layer 170.

Figure 4:
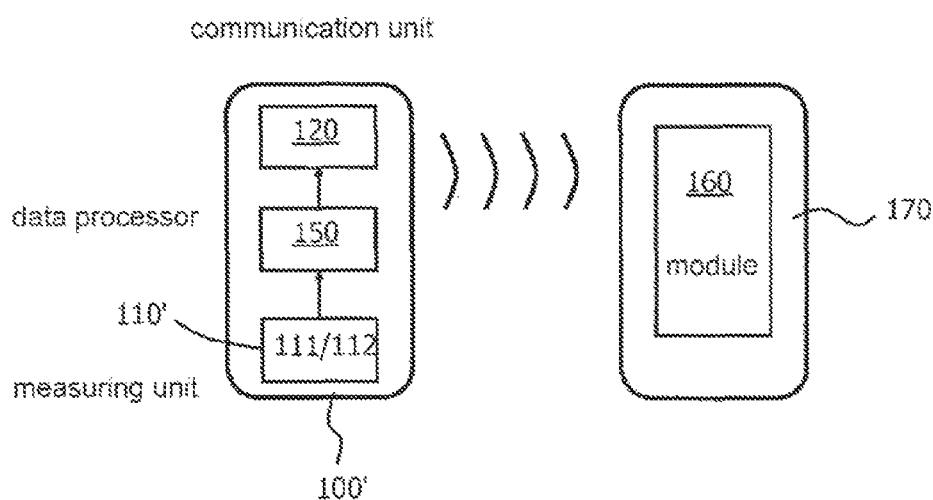
FIG. 4 schematically shows components of a gesture recognition system realized by an integrated device.

FIG. 4 shows a modified gesture recognition system 100', in which the data processing device 150' is integrated with the gesture detection device 110'. A wireless communication unit 120 can be used for communicating the results of the recognition process to a controlled device 170.

In the embodiment of FIG. 4, the device worn by the user will require some processing power. However, the data transfer is significantly reduced as no raw data have to be transmitted.

The above embodiments of the invention can be modified in a variety of ways. For example, if conductance is measured only between two points, the set of gestures that can be recognized is rather limited since many gestures will have the same or only a very small effect on conductance. The proper location of the two measurement points (electrodes) also affects the set of recognizable hand postures. For this reason, it is preferred that conductance is measured between more than two points.

The conductance of the skin is affected by many factors, and therefore measuring an immediate conductance will usually not give a good estimate of the gesture (even immediately after a calibration). Instead a range of values over a short period of time can be measured. This "string" of values can then be used to recognize the gesture. The techniques that are used to recognize 2-dimensional gestures on a flat touch panel can be employed to recognize such a string of values. For example the SVM (Support Vector Machine) method can be used for this. Details about this method may be found in literature (e.g. Corinna Cortes and V. Vapnik, "Support-Vector Networks", Machine Learning, 20, 1995).

Moreover, the change in conductance may be determined. This change may be measured either during a transition from one gesture to another (e.g. transition from fist to open palm), or when a gesture already made.

FIG. 1 shows an embodiment in which a flexible thin device 110 is simply "stuck" to the skin (in the same fashion as a medical patch). Depending on the application at hand, a "wristband user interface" design might instead be preferred, which is made in the form of a wristband wrapped around the wrist.

In summary, the present invention discloses an unobtrusive method for supporting gesture based interaction. The method allows to identify for example finger and hand postures (e.g. fist, open palm, OK, etc). It is based on measuring the skin and body conductance at the few spots on the user's body. Based on differences in the skin and body conductance, the particular posture can be uniquely identified.

An essential feature of the invention is the scalability of the method, i.e. based on the required precision and the required set of gestures, the location and number of required contacts between which conductance is measured can be estimated. In the simplest case only two contact points are required. So for the light weight consumer applications a simple flat patch like device equipped with wireless communication can be created.

A user interface according to the invention can for example be used for supporting simple effortless gesture interaction with different appliances and systems including CL devices (kitchen appliance that will benefit from touch less interaction, portable devices such as mp3 player etc.), healthcare devices, and the like.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A gesture recognition system for detecting gestures of a bodily part of a user, the system comprises:
    an input configured to receive signals from a first electrode for making a first electric connection with a first area of a skin at the bodily part, and a second electrode for making a second electric connection with a second area of the skin at the bodily part, different from the first area;
    the detecting of a specific gesture of the gestures comprises determining a specific electrical property of the skin between the first electrode and the second electrode;
    the specific gesture involves stretching of specific regions of the skin of the bodily part or compressing of other specific regions of the skin of the bodily part;
and
    a value of the specific electrical property depends on the stretching or on the compressing,
    wherein the first electrode and the second electrode are each configured to measure a passive electrical property of the skin for the determining of the specific electrical property of the skin between the first electrode and the second electrode.

2. The gesture recognition system of claim 1, wherein: the detecting comprises determining a change of the specific electrical property over a period of time.

3. The gesture recognition system of claim 2, wherein the change of the specific electrical property comprises one of a single value representing a rate of change and a plurality of values representing a trajectory of the change of the specific electrical property.

4. The gesture recognition system of claim 1, wherein: the first electrode and the second electrode are accommodated at a flexible carrier configured for remaining in physical contact with the skin in operational use of the system.

5. The gesture recognition system of claim 1, wherein the passive electrical property of the skin is a property comprising no active generation of electrical voltages in and by the bodily part of the user.

6. The gesture recognition system of claim 1, wherein the specific electrical property of the skin is an electrical conductance of the skin.

7. The gesture recognition system of claim 1, wherein the first electrode and the second electrode measure the passive electrical property of the skin during a transition between gestures.

8. A method for detecting gestures of a bodily part of a user, comprising acts of:
in a gesture recognition device:
using a first electrode for making a first electric connection with a first area of a skin at the bodily part;
using a second electrode for making a second electric connection with a second area of the skin at the bodily part, different from the first area; and
detecting a specific gesture of the gestures by determining a specific electrical property of the skin between the first electrode and the second electrode,
wherein the specific gesture involves stretching of specific regions of the skin of the bodily part or compressing of other specific regions of the skin of the bodily part,
wherein a value of the specific electrical property depends on the stretching or on the compressing, and
wherein the first electrode and the second electrode are each configured to measure a passive electrical property of the skin for the determining of the specific electrical property of the skin between the first electrode and the second electrode.

9. The method of claim 8, wherein the passive electrical property of the skin is a property comprising no active generation of electrical voltages in and by the bodily part of the user.

10. The method of claim 8, wherein the specific electrical property of the skin is an electrical conductance of the skin, and wherein the first electrode and the second electrode measure the conductance of the skin during a transition between gestures.

11. A gesture recognition system for detecting gestures of a hand part of a user including a hand and a wrist of the user, comprising:
a first electrode for making a first electric connection with skin at a back side of the hand part;
a second electrode for making a second electric connection with the skin at a front side of the hand part opposite the back side; and
a processor configured to detect a specific gesture of the gestures by determining a change in an electrical conductance of the skin between the first electrode and the second electrode; wherein the gesture recognition system further comprising a detector configured to measure the change in the electrical conductance resulting from the specific gesture during the transition from a first gesture to a second gesture without active generation of electrical voltages.

12. The gesture recognition system of claim 11, wherein the change of the electrical conductance comprises one of a single value representing a rate of change and a plurality of values representing a trajectory of the change of the electrical conductance.

13. The gesture recognition system of claim 11, wherein the specific gesture includes stretching the skin at the back side and compressing the skin at the front side, and wherein a value of the electrical conductance depends on the stretching or the compressing.

14. The gesture recognition system of claim 11, wherein the first electrode is accommodated at a first flexible carrier and the second electrode is accommodated at a second flexible carrier, the first flexible carrier and the second flexible carrier being configured for remaining in physical contact with the skin during operational use of the system.

15. The gesture recognition system of claim 14, wherein the second flexible carrier further comprises additional electrodes.

16. The gesture recognition system of claim 15, further comprising a detector configured to measure the change in the electrical conductance by performing a plurality of conductance measurements between more than two electrodes of the first, second and additional electrodes.

17. The gesture recognition system of claim 11, wherein the processor is further configured to detect the specific gesture from a plurality of temporally consecutive measurement data of the change in the electrical conductance.

18. A tangible computer-readable storage-medium that is not a transitory propagating signal or wave, the medium modified by control information including instructions for performing a method for detecting gestures of a bodily part of a user, comprising acts of:
in a gesture recognition device:
using a first electrode for making a first electric connection with a first area of a skin at the bodily part;
using a second electrode for making a second electric connection with a second area of the skin at the bodily part, different from the first area; and
detecting a specific gesture of the gestures by determining a specific electrical property of the skin between the first electrode and the second electrode,
wherein the specific gesture involves stretching of specific regions of the skin of the bodily part or compressing of other specific regions of the skin of the bodily part,
wherein a value of the specific electrical property depends on the stretching or on the compressing, and
wherein the first electrode and the second electrode are each configured to measure a passive electrical property of the skin for the determining of the specific electrical property of the skin between the first electrode and the second electrode.

* * * * *